(12) United States Patent
Bury et al.

(10) Patent No.: US 10,668,867 B2
(45) Date of Patent: Jun. 2, 2020

(54) HOLDING SYSTEM FOR AN ELECTRONIC DEVICE IN A VEHICLE

(71) Applicant: BURY SP. Z. O. O, Mielic (DE)

(72) Inventors: Henryk Bury, Loehne (DE); Andrzej Bury, Mielec (PL)

(73) Assignee: BURY SP.Z.O.O, Mielec (PL)

( * ) Notice: Subject to any disclaimer, the term of this patent is extended or adjusted under 35 U.S.C. 154(b) by 0 days.

(21) Appl. No.: 16/309,145

(22) PCT Filed: Jun. 14, 2017

(86) PCT No.: PCT/EP2017/064600
§ 371 (c)(1),
(2) Date: Dec. 12, 2018

(87) PCT Pub. No.: WO2017/220413
PCT Pub. Date: Dec. 28, 2017

(65) Prior Publication Data
US 2019/0329717 A1    Oct. 31, 2019

(30) Foreign Application Priority Data
Jun. 22, 2016 (DE) .......................... 10 2016 111 448

(51) Int. Cl.
*B60R 11/02* (2006.01)
*H02J 50/90* (2016.01)
(Continued)

(52) U.S. Cl.
CPC .......... *B60R 11/0241* (2013.01); *H02J 7/025* (2013.01); *H02J 50/90* (2016.02);
(Continued)

(58) Field of Classification Search
CPC ......... B60R 11/0241; B60R 2011/0003; B60R 2011/0052; B60R 2011/0056;
(Continued)

(56) References Cited

U.S. PATENT DOCUMENTS

2004/0028219 A1    2/2004   Lin
2004/0091102 A1    5/2004   Tsay
(Continued)

FOREIGN PATENT DOCUMENTS

DE    10 2004 062 178 B4    6/2006
DE    10 2005 044 946 B4    6/2009
(Continued)

*Primary Examiner* — Corey N Skurdal
(74) *Attorney, Agent, or Firm* — W&C IP

(57) ABSTRACT

The invention relates to a holding system for a telecommunication device (46) in a vehicle, comprising a receiving part (1) for fastening in a stationary manner and a holder (40) dial can be inserted into die receiving pan (1), on which holder the telecommunication device (46) can be detachably fastened. Said holding system is characterized in that the receiving part (1) has a receiving channel (10) having a slot-shaped entry opening (7), into which receiving channel an attachment (21), which is shaped complementary to the receiving channel (10) and is connected to the holder (40) in the mounted state, can be inserted in an insertion direction and in which receiving channel said attachment can be fastened in the inserted state.

11 Claims, 14 Drawing Sheets

(51) Int. Cl.
*H02J 7/02* (2016.01)
*B60R 11/00* (2006.01)

(52) U.S. Cl.
CPC ............... *B60R 2011/0003* (2013.01); *B60R 2011/0052* (2013.01); *B60R 2011/0056* (2013.01); *B60R 2011/0063* (2013.01); *B60R 2011/0087* (2013.01)

(58) Field of Classification Search
CPC ...... B60R 2011/0063; B60R 2011/0087; H02J 50/90; H02J 7/025
See application file for complete search history.

(56) References Cited

U.S. PATENT DOCUMENTS

| | | |
|---|---|---|
| 2007/0170330 A1 | 7/2007 | Yeh et al. |
| 2009/0305748 A1 | 12/2009 | Piekarz |
| 2013/0244735 A1* | 9/2013 | Bury .................. H04M 1/0262 455/573 |
| 2014/0203770 A1 | 7/2014 | Salter et al. |
| 2015/0076853 A1 | 3/2015 | Skolimowski et al. |
| 2015/0329062 A1 | 11/2015 | Ackeret et al. |
| 2017/0214260 A1* | 7/2017 | Kim .................. H02J 7/0044 |

FOREIGN PATENT DOCUMENTS

| | | |
|---|---|---|
| DE | 10 2013 222 449 A1 | 5/2014 |
| DE | 10 2014 201 295 A1 | 7/2014 |
| DE | 10 2013 203 920 A1 | 9/2014 |
| DE | 10 2013 015 490 A1 | 3/2015 |
| EP | 1 266 456 B1 | 4/2007 |
| EP | 2 000 364 A1 | 12/2008 |
| FR | 2 972 694 A1 | 9/2012 |
| WO | 2006/010500 A1 | 2/2006 |
| WO | 2010/028541 A1 | 3/2010 |

* cited by examiner

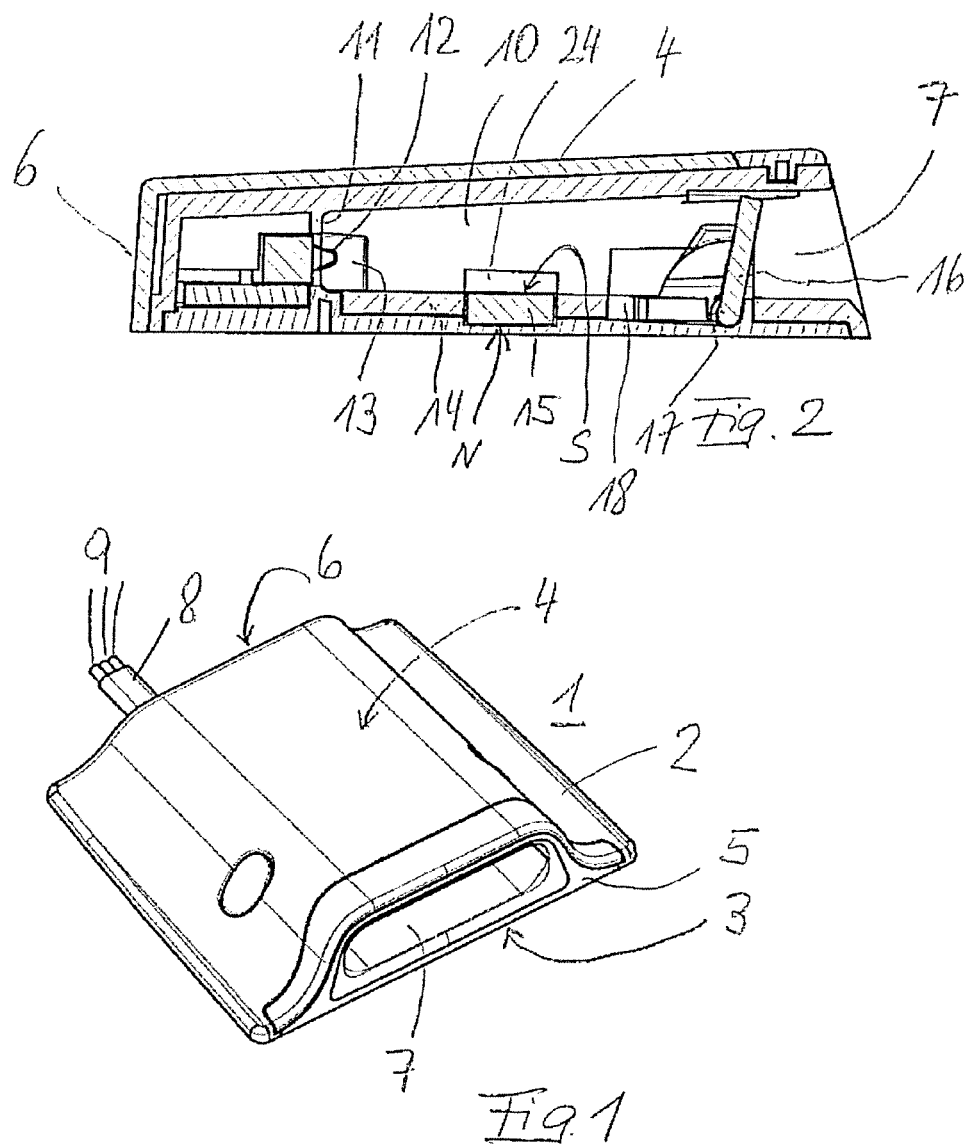

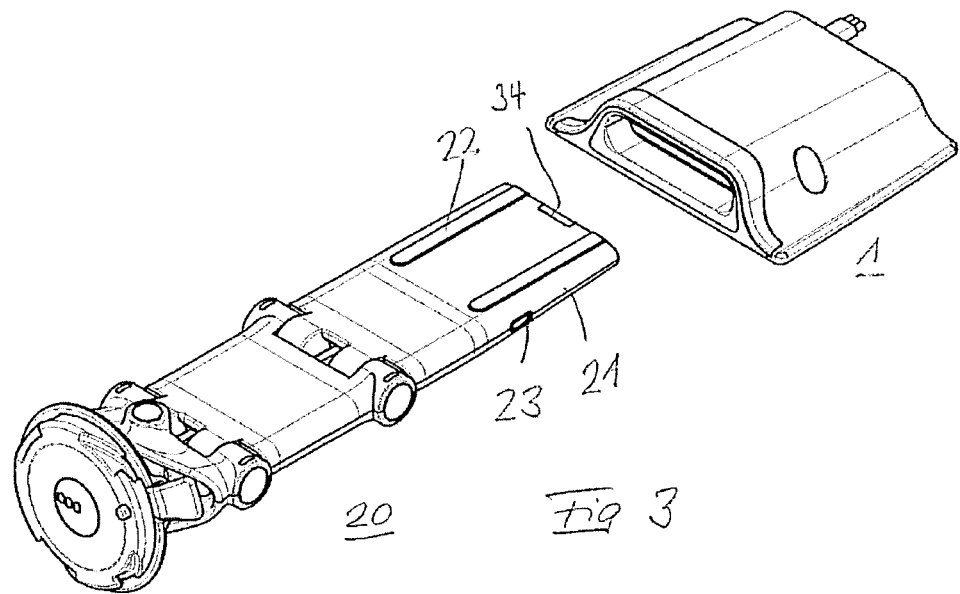

A-A

HOLDING SYSTEM FOR AN ELECTRONIC DEVICE IN A VEHICLE

The invention relates to a holding system for an electronic device, in particular a telecommunications device, in a vehicle, having a receiving part provided for immovable fastening, and a mount, to which the electronic device can be removably fastened, which can be inserted into the receiving part.

Numerous holding systems are known by means of which a telecommunications device, in particular a telecommunications device suitable for making telephone calls, can be fastened in a vehicle in order, for example, to be able to make telephone calls without having to take a hand off the steering wheel. It has been shown to be worthwhile here to provide a receiving part which can be placed in the vehicle as unobtrusively as possible and does not adversely affect the esthetic impression of the interior fittings of the vehicle when no mount and no telecommunications device are fastened on the receiving part.

In addition to the object of mechanically holding the telecommunications device, the mount can also fulfil the object of supplying electricity to the telecommunications device inserted therein such that, when inserted in the mount, the telecommunications device does not consume any electrical energy from its own battery, and moreover its own battery can be charged by the electrical system of the vehicle.

A known system, as described for example in EP 1 266 456 B1, has a receiving part into which a mount can be inserted, wherein, when the mount is inserted, contacts of the mount make contact with contacts of the receiving part so as to in this way transmit a supply voltage and if appropriate further electrical signals to the mount. The mount is here adapted mechanically and electrically to a specific type of device in order to take into account that different types of telecommunications devices have both different mechanical dimensions and different positions and embodiments of electrical connections.

Because contemporary telecommunications devices can transmit almost all their electrical signals wirelessly at close range, such as for example via Bluetooth signals, the requirement for the mount to contact the receiving part has been reduced to the transmission of the electrical voltage (cf DE 10 2005 044 946 B4). In many cases, only a switching signal is additionally transmitted, by means of which the conductance of the supply voltage to the mount is controlled only depending on the position of the ignition switch or the detection of the ability of the vehicle to start owing to an access code, in order to prevent inadvertent discharging of the vehicle battery in the absence of the driver, in particular when the vehicle has been not used for a relatively long time. It is alternatively possible of course to connect a pole of the supply direct current which does not form the ground terminal to the receiving part via a corresponding switch and consequently to the mount.

The known system has made it possible for the installation in the vehicle to remain unchanged when a different telecommunications device is to be used. This fact needed to be taken into account because, as is well known, the amount of time for which users retain telecommunications devices is often very short as more and more new telecommunications devices with more and more new functions and options are being developed and come onto the market very frequently. In this case, it was then only necessary to provide a suitable mount for the new telecommunications device because the connection between the mount and the receiving part for this system was always the same.

Telecommunications devices have moreover been known and available on the market for some time which can no longer be charged via a cable connection but inductively via an induction coil. The mount adapted for the corresponding telecommunications device here has a corresponding induction coil which is positioned such that it can interact with the induction coil of the telecommunications device with the highest possible efficiency for the charging.

Previously, attempts were made to avoid the complexity for a mount adapted specifically to the telecommunications device by a mount with adjustable holding arms being used such that different sizes of a telecommunications device can be held by the mount after the holding arms have been adjusted accordingly. However, these devices usually did not allow any electrical connection and therefore primarily served as a mechanical mount. When it was required for the battery of the telecommunications device to be charged in the mount, a separate electrical connection, for example by means of a suitable charging cable, was provided, for which purpose an adapter which fits into a cigarette lighter was usually used. Because such a solution is no longer sufficient for modern needs, such a solution is not considered for more demanding solutions. DE 10 2004 062 178 B4 provides a charging cable connection between the receiving part and the mount.

The holding system to date has proved its worth and brought numerous advances. In particular with regard to the design of the interiors of vehicles, in particular passenger vehicles, a built-in visible receiving part can be considered obtrusive. Owing to the present structures, limitations are therefore imposed on the positioning of the corresponding receiving parts, unless the receiving part is covered in a complex fashion by a flap or the like. The mechanical locking of the mount on the receiving part has furthermore proven to require a degree of handling which is no longer sufficient for the high demands in terms of comfort.

The object of the present invention is therefore to develop a holding system, based on a new concept, which enables an unobtrusive and esthetically appealing fitting inside the vehicle and is adapted to the functions of modern telecommunications devices.

This object is achieved with a holding system of the type mentioned at the beginning by the receiving part having a receiving socket with a slot-like entrance opening into which a projection, with a shape complementing the receiving socket and connected to the mount when fitted, can be pushed in a push-in direction and can be fixed in the pushed-in state.

The present invention is based on the concept of a plate-like receiving part, which has corresponding locking elements, by means of which the rear side of the mount can be locked mechanically on the plate-like receiving part, and instead a receiving part is provided which itself only forms a small flat housing when subsequently fitted because a wide receiving socket of small height is formed such that a slot-like entrance opening results into which the projection can be pushed. The projection can be fixed in the receiving socket in the pushed-in state such that a mechanically stable mount is ensured in this way. Because the fixing of the projection in the receiving socket takes place inside the receiving socket, only the flat housing of the receiving part is visible from outside, without any locking elements. The receiving part according to the invention has a universal design because it enables connection to different projections which can be part of different devices. The design of a receiving socket in the receiving part enables an appropriate projection to be guided in a stable fashion and the projection, or the device provided with the projection, to be locked in a stable fashion and so that it does not become detached undesirably with the usual movements of a vehicle. By virtue of the universal design of the receiving part, it is also capable of receiving other electronic devices that are not telecommunications devices, for example fragrance dispensers, flashlights, etc.

In a preferred embodiment, at least one magnet is arranged in at least one side of the receiving socket such that magnetic poles result which are active in the push-in direction. Magnetic poles are correspondingly formed in the projection which, when the projection is oriented correctly in the receiving socket, draw the projection into a fixed position in the receiving socket and, when there is incorrect orientation, hinder the achievement of the fixed position.

The projection can therefore only be completely pushed in and fixed in the receiving socket when the projection is pushed into the entrance opening with correct orientation in an intended fashion. This is particularly important when an electrical connection is produced between the receiving part and the projection which cannot be made with the wrong polarity, as is the case with a direct-current supply in a vehicle. The magnetic poles prevent unintended orientation of the projection in the receiving socket—and hence any incorrect polarity of a connected device, in particular a telecommunications device—and thus enable a projection to be formed with no annoying mechanical coding so that the projection can also have a visually attractive form with a smooth surface, which avoids any risk of contamination because of hard-to-clean corners and crevices. Furthermore, a very pleasant handling sensation is achieved owing to the magnetic poles because the magnetic poles draw the projection and the device connected thereto into the receiving socket and into the fixed position and hence provides a comfortable handling sensation for the user. Unlike with previous systems, a user does not need to release a locking mechanism using a carefully measured amount of force and establish via a corresponding noise whether there is proper locking in the receiving part. Instead, according to the invention, the user is given a sensation of automation when the correctly inserted projection is drawn into its fixed position with the aid of magnetic force.

In the fixed position, mechanical snapping into place preferably takes place, from which the projection can be withdrawn again only using a certain amount of tensile force. The fixing of the projection in the receiving socket is additionally ensured in this way. It is consequently possible to apply the drawing-in force effected by the magnetic poles to the projection in a way that is suitable for handling without the complete fixing force for the projection in the receiving socket having to be applied by the magnetic poles alone.

It is particularly preferred if the holding system also the transfer of electricity, in particular in order to charge a telecommunications device, a flashlight battery, a power bank, or the like. For this purpose, in a preferred embodiment of the invention, the receiving part can be connected to electrical connection cables and has connection contacts in an end wall of the receiving socket. For this purpose, the projection is accordingly provided with contact elements contacting the connection contacts in the fixed position, and with cables connected thereto for supplying electric potential to the mount. The positioning according to the invention of the projection in the receiving socket thus ensures that the contact elements of the projection produce an electrical contact with the connection contacts of the receiving part such that, in this way, the supply of voltage can, for example, be transmitted from the receiving part to the projection. A corresponding transmission of the supply voltage to the mount is effected from the projection.

In order to prevent a short-circuit owing to conductive foreign bodies which have found their way into the receiving socket, in an embodiment of the invention it can be provided for the end wall of the receiving socket to be provided with at least one protrusion next to the connection contacts. A coin which, for example, finds its way into the receiving socket is then not capable of touching the connection contacts and connecting each other and causing a short-circuit. An electrical connection accordingly takes place only via the projection which has at least one corresponding recess, which receives the protrusion in the pushed-in state, on its free end side.

In an embodiment of the invention, in the region of the slot-shaped entrance opening the width of the receiving socket is at least twice its height. It is further preferred if the height reduces the greater the distance from the entrance opening. Accordingly, there is an equal reduction in the height of the projection toward its free end. This reduction in height can take place in stepwise fashion. In an embodiment of the invention, the reduction in height takes place constantly such that the projection is designed so that it tapers conically with regard to its height.

The entrance opening can be provided with a hinged flap which is pretensioned by means of a spring into a position closing the entrance opening and is pivoted by the pushed-in projection into a position opening the receiving socket. It is consequently possible to maintain the entrance opening in the closed state for as long as there is no projection pushed into the entrance opening. The flap is here preferably at an obtuse angle to the opening position in order thus to make it harder for the flap to be opened by an object which may by chance fall against the flap.

The receiving part can be attached at different points in the vehicle. When the projection is connected rigidly to the mount, the positioning of the receiving part also largely fixes the positioning and possibly the readability of the telecommunications device. Although it is possible to attach the telecommunications device pivotably to a ball bearing on the projection, the location of the telecommunications device is nevertheless determined by the position of the receiving part. According to the invention, a remedy is provided by the projection being part of an intermediate piece which is designed as a pivotable arm, the free end of which has a fastening plate for fastening the mount. The mount can thus be attached detachably to the intermediate piece. The telecommunications device held by the mount can be pivoted into a more favorable position by the pivoting of the arm.

This is in particular possible if the pivotable arm has at least three sections and two horizontal swivel joints spaced apart from each other and a vertical swivel joint perpendicular thereto. In this way, the positioning of the device held by the mount can take place over a large range, wherein, in particular by a Z-like pivoting of the sections via the two horizontal swivel joints, the height and, by virtue of the vertical swivel joint, the orientation of the telecommunications device can be adjusted.

In an advantageous embodiment of the invention, the mount is provided for receiving different telecommunications devices with adjustable holding arms. The holding system according to the invention thus makes it possible to do without mounts adapted to a specific telecommunications device, and for virtually universal mounts to be used in which telecommunications devices of different dimensions can be fastened. This is particularly advantageous if the mount has an induction coil in its rear wall and a display which displays a correct positioning of the telecommunications device provided for inductive charging in front of the induction coil during the adjustment of a holding arm which takes the form of a base and carries the telecommunications device. During inductive charging of the device, there is no longer any need for a galvanic electrical connection between the mount and the telecommunications device. It is therefore only a matter of the induction coil of the mount being optimally positioned with the corresponding induction coil of the telecommunications device for the telecommunications device to be charged in the mount in the most efficient way.

Because the charging coils of telecommunications devices are usually arranged in the center axis, it is preferred if two lateral holding arms can be adjusted only when coupled to each other so that telecommunications devices of different widths can always be positioned centrally in front of the rear wall.

The invention is explained in detail below with the aid of exemplary embodiments shown in the drawings, in which:

FIG. 1 shows a perspective view of a housing of a receiving part;

FIG. 2 shows a longitudinal section through the receiving part according to FIG. 1;

FIG. 3 shows a perspective view of a receiving part and an intermediate piece with a projection which can be pushed into a receiving socket of the receiving part;

Figure 4:
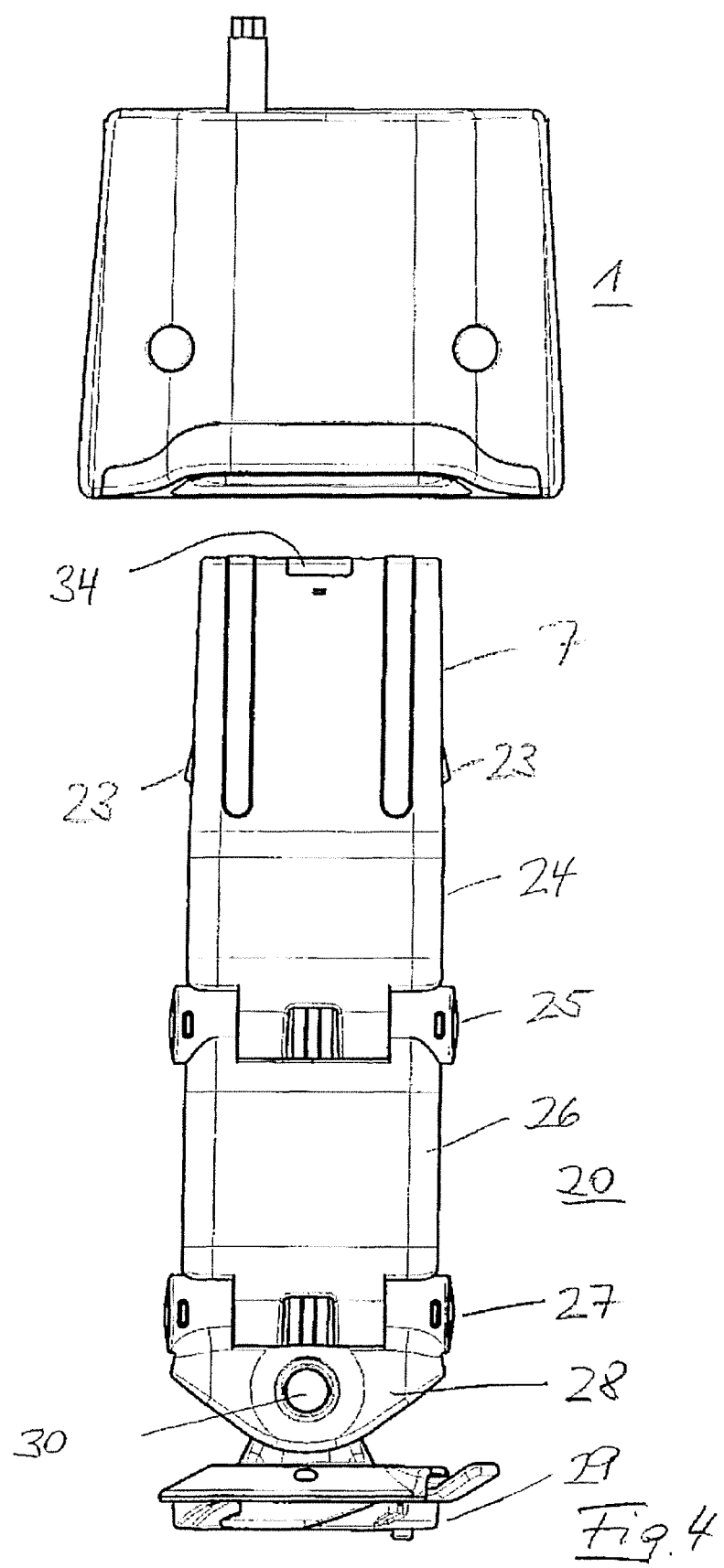
FIG. 4 shows a plan view of the arrangement according to FIG. 3.

FIG. 1 shows a receiving part which has a housing 2 with a flat underside 3 and a curved, domed top side 4. The housing 2 is provided with a front end side 5 and a rear end side 6. As illustrated in FIG. 2, the rear end side is closed, whereas the front end side 5 has a slot-like entrance opening 7 with a width significantly greater than its height, wherein the width/height ratio of the entrance opening is greater than 2:1, in particular greater than 2.5:1, and preferably greater than 3:1.

FIGS. 1 and 2 show that the height of the curved, domed top side 4 decreases continually from the front end side 5 to the rear end side 6.

On the rear end side 6, the housing 2 allows the passage of an electrical connection cable 8 which, in the exemplary embodiment shown, takes the form of a flat cable with three conductors 9. The three conductors can convey "+" polarity, "−" polarity (ground), and a switching signal "ignition on/off".

To the side of the entrance opening 7 and over the whole length of the housing, the curved, domed top side 4 of the housing 2 lies directly on the underside 3 and rises from there toward the center, as a result of which the space for the rectangular slot-like entrance opening 7 is created in the region of the front end side 5. A receiving socket 10, which extends backward from the entrance opening 7 and the height of which reduces continually in a corresponding fashion owing to the backward sloping top side 4 and which ends at an end wall 11, is formed in the inside of the housing. Three contacts 12, which take the form of spring contacts and are each connected to one of the three conductors 9, project through the end wall 11. Protrusions 13, which extend further into the receiving socket 10 than the spring contacts 12, are situated in the end wall 11, between the contacts 12. It is consequently made impossible for the contacts 12 to be closed by, for example, a coin which has fallen or been pushed into the receiving socket 10.

A plurality of magnets 15, which are preferably permanent magnets and only one of which is shown in FIG. 2, are preferably situated in a base 14 of the receiving socket. The permanent magnets take the form of a magnetic north pole N and a magnetic south pole S, directed in the same way, which lie one behind the other transverse to the longitudinal direction of the receiving socket 10 (push-in direction) such that the south pole S is arranged so that it faces the receiving socket 10, and the north pole N is arranged so that it faces away from the receiving socket 10.

The slot-like entrance opening 7 is pivoted, by a pivotably mounted flap 16 under the action of a spring, about a pivot bearing 17 into a closed position which is shown in FIG. 2. The free end of the flap is here pivoted somewhat more than 90° relative to the base so that the flap 16 forms an obtuse angle with the base 14 on the inside of the receiving socket 10. A narrow object bearing on the flap 16 thus falls toward the pivot bearing 17 and makes it harder to open the flap 16. In order to open the receiving socket 10, the flap 16 needs to be pivoted inward into the receiving socket 10 from the closed position shown in FIG. 2 until the flap comes to lie in a matching recess 18 of the base 14 and thus frees the receiving socket 10.

FIG. 3 shows an intermediate piece 20, designed to be received in the receiving part 1, the shape of which matches the shape of the receiving socket 10. Accordingly, the height of the projection 21 tapers continually so that it is guided in the receiving socket 10 in a stable fashion and with low tolerances.

The projection 21 has two strips 22 inserted into its surface on the top side. Two corresponding strips 22 are moreover situated on the underside which is not shown in FIG. 3. The strips 22 are made from textile, in particular flocked textile, and project, as a scratch-prevention means during the push-in movement, slightly above the adjacent surface.

When the projection 21 is pushed into the receiving socket 10, a fixed position results from locking catches 23 which are provided on the side of the projection and can engage resiliently in corresponding locking recesses 24 (FIG. 2) of the receiving socket 10. For this purpose, the locking catches 23 are usually provided with a sawtooth-shaped initial slope, adjoined by a locking slope with a considerably bigger inclination. As a result, much less force is required to pull the projection 21 into the locking position than to withdraw it from the locking position. On its front free side, the projection 21 has a recess 34 in which the protrusion 13 situated between the contacts 12 in the end wall 11 of the receiving socket 10 is received so that the projection 21 can contact the contacts 12 with front-side contact faces (not shown).

FIGS. 3 and 4 illustrate that the projection 7 is part of a first section of the intermediate piece 20. The first section 24 is connected to a second section 26 of the intermediate piece 20 via a first horizontal swivel joint 25. This forms a rigid connecting piece and is connected to a third section 28 of the intermediate piece 20 via a second horizontal swivel joint 27. The three sections 24, 26, 28 of the intermediate piece 20 thus form a device arm which allows the adjustment of different heights and different distances from the receiving part 1, by virtue of a more or less pronounced Z-shaped angling of the sections relative to one another, when the intermediate piece 20 is pushed into the receiving part 1.

A fastening plate 29 of circular design is connected to the third section 28 via a vertical swivel joint 30 standing at right angles to the axes of the horizontal swivel joints 25, 27.

Figure 5:
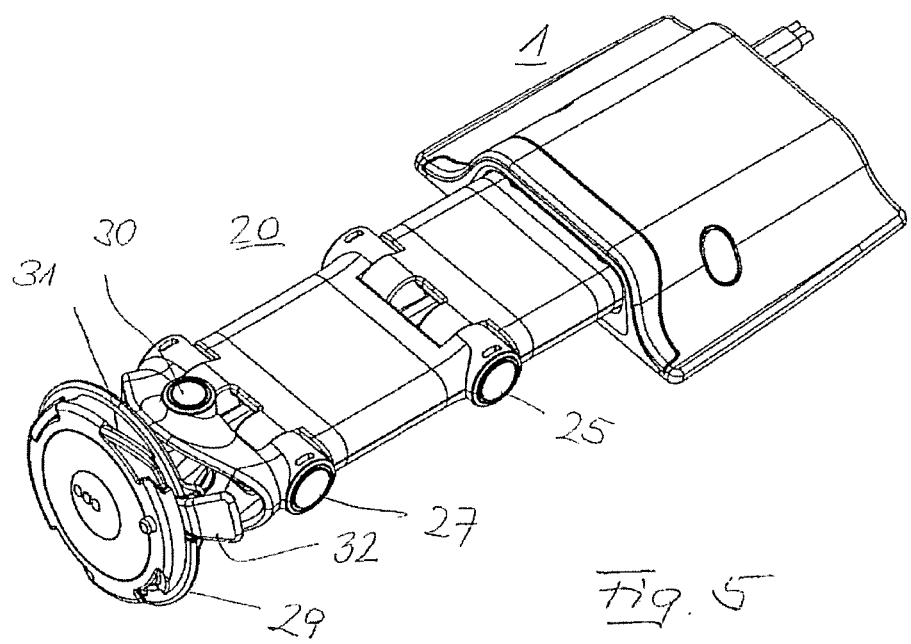
FIG. 5 shows a view according to FIG. 3 with the projection pushed into the receiving socket.

As a result, the fastening plate 29 can be pivoted about a vertical axis. As can be seen in particular in FIG. 5, the fastening plate 29 is provided with a twist-lock closure. By virtue of the addition of corresponding locking catches, in a starting position the latter can, by being rotated, run on spirally arranged locking slopes and be pressed into a locking position behind the locking slopes by the action of a resilient plate. The spring pressure can be released with the aid of a lever 32 such that the plate can be turned back out of the twist-lock closure 31.

The electrical potentials are conducted through the intermediate piece 20 via the swivel joints 25, 27, and 30 and pass to three asymmetrically arranged contact faces 33 on the fastening plate, as explained in detail below.

Figure 6:
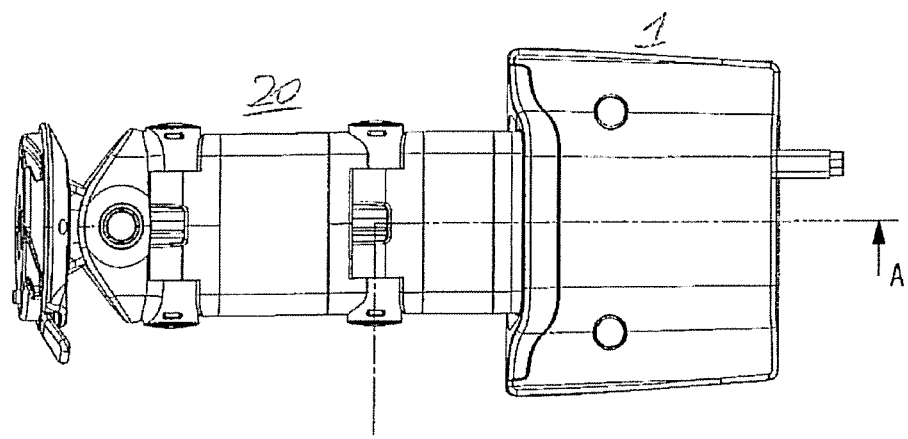
FIG. 6 shows a plan view of the arrangement according to FIG. 5.
Figure 7:
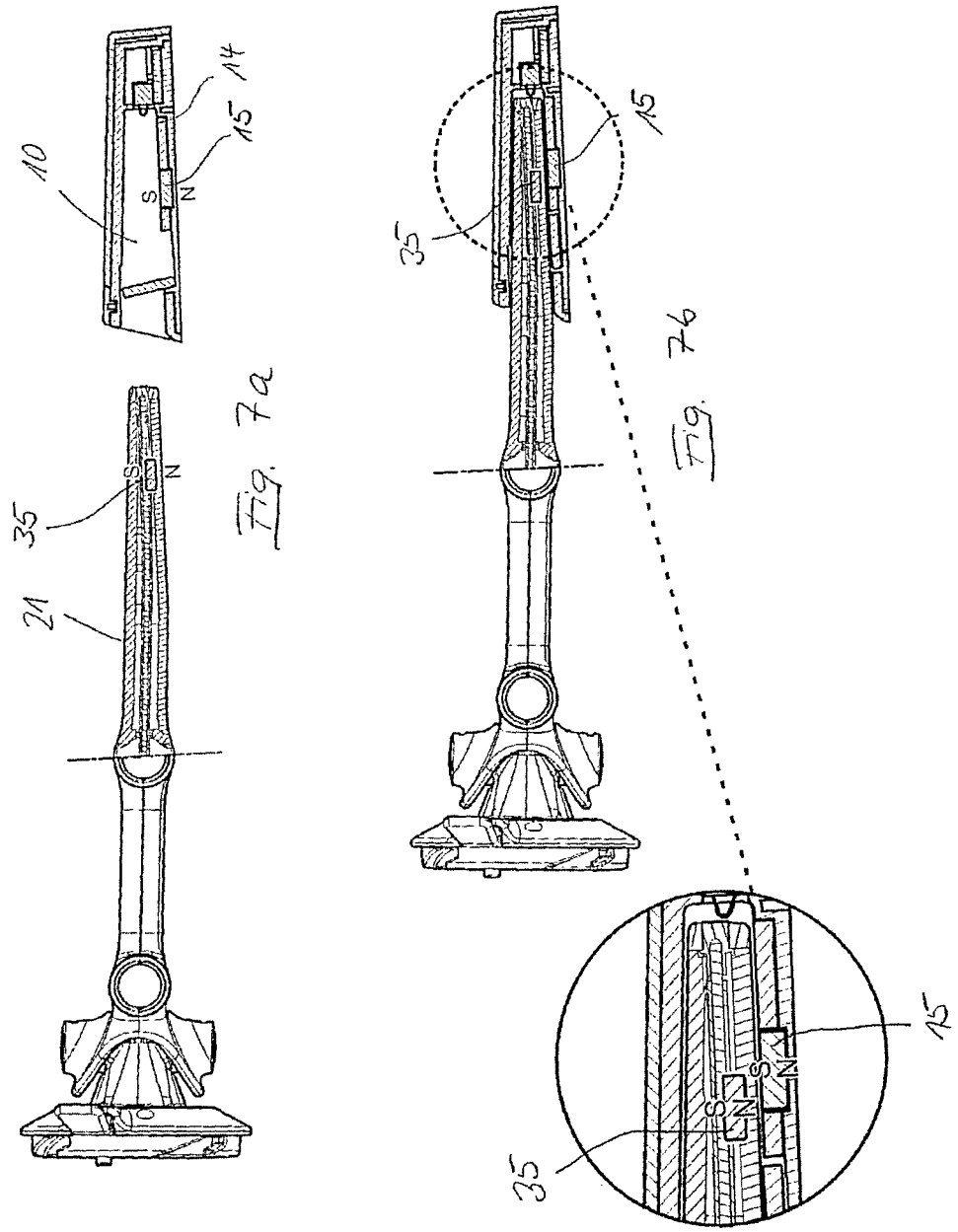
FIG. 7 shows a partial longitudinal section along the line A-A in FIG. 6, according to FIG. 7*a* in the as yet uninserted position, and according to FIG. 7*b* in the inserted position of the projection in the receiving socket.

FIGS. 6 and 7a and 7b again illustrate the fastening of the intermediate piece 20 in the receiving part 1 by the projection 21 being pushed into the receiving socket 10. The flap 16 pushed down by the projection 7b can be seen in FIG. 7.

It can be seen in FIG. 7a that the magnets 15 situated in the base 14 of the receiving socket 10 have a magnetic pole (in this case, a south pole S) facing the receiving socket 10, and a magnetic pole (in this case, a north pole N) facing away from the receiving socket 10. The projection 21 is provided with corresponding magnets 35 which have an orientation of a north pole N and south pole S which also extends transversely to the longitudinal axis of the projection 21.

As illustrated in FIG. 7b, the magnets 15, 35 interact when the projection 21 is pushed into the receiving socket 10. The magnetic poles N, S are here positioned such that, in the completely pushed-in state of the projection 21, the magnetic pole N of the magnets 35 in the projection 21 is brought closer to the magnetic pole S of the magnets 15 in the base 14 of the receiving socket 10. As a result, the projection 10 is drawn magnetically into the receiving socket 10.

If, in contrast, the projection 21 is pushed into the receiving socket 10 in a wrong position rotated by 180°, identically named poles N or S move visibly closer to one another, as a result of which there is increased resistance to the pushing of the projection 21 into the receiving socket 10. Exerting the normal amount of force, it is therefore not possible to push the projection 21, in the (incorrect) position rotated by 180°, into the receiving socket 10 so far that a locking position can be reached. In contrast, in the correct orientation of the projection 21, the projection 21 is drawn into the receiving socket 10 by the magnets 15, 35 as far as the fixed position which results from the interaction of the locking catches 23 and the locking recesses 24 (FIG. 2). The maximum magnetic force is achieved when the differently named poles of the magnets 15, 35 are completely oriented relative to one another, i.e. are aligned with one another with their center axes. As illustrated in FIG. 7b, in particular in the enlargement shown, in practice this position does not however need to be achieved exactly.

The swivel joints 25, 27, 30 of the intermediate piece 20 take the form of self-locking swivel joints by virtue of being provided with plates which can be tensioned relative to each other. The electric potentials can be transmitted via the swivel joints by virtue of an alternating design of metal and insulating plates.

Figure 8:
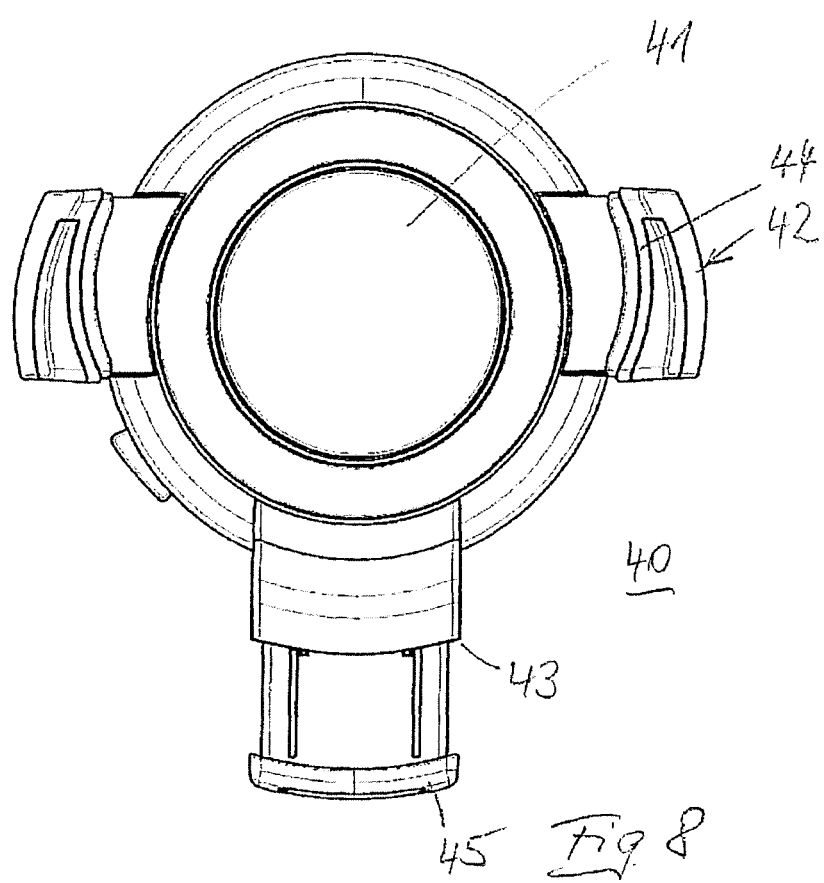
FIG. 8 shows a side view of a mount with extended holding arms.
Figure 9:
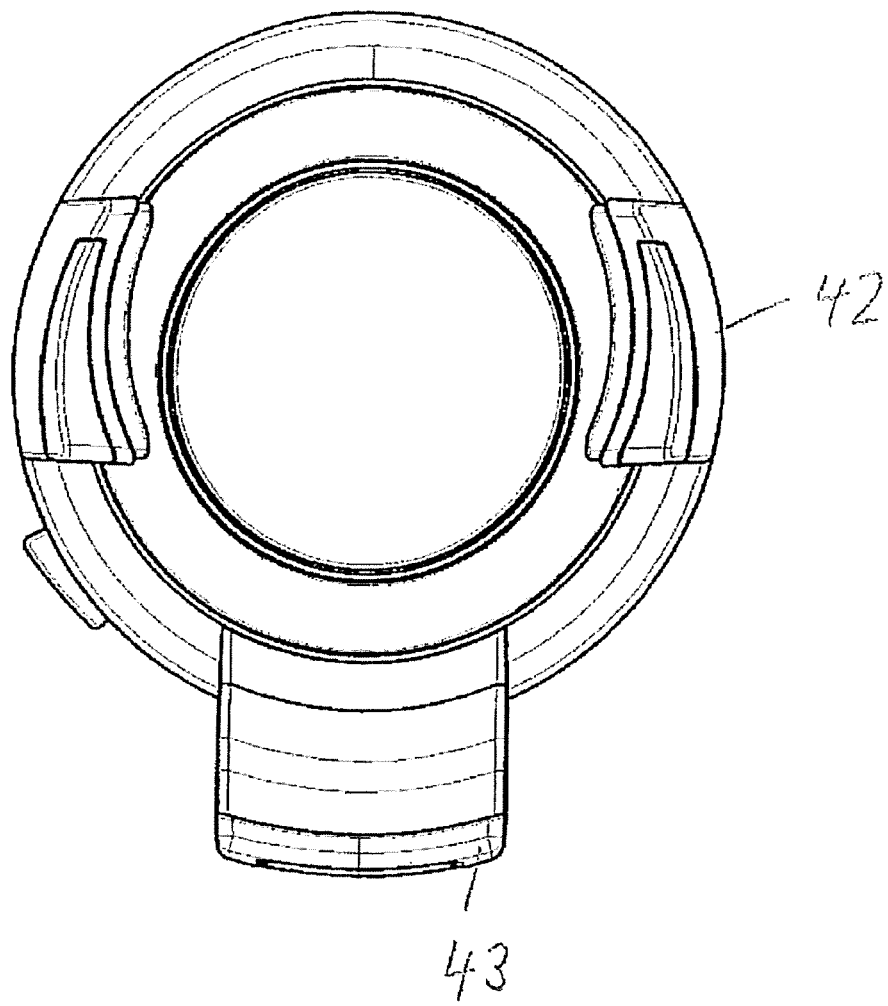
FIG. 9 shows the side view according to FIG. 8 with maximally retracted holding arms.
Figure 10:
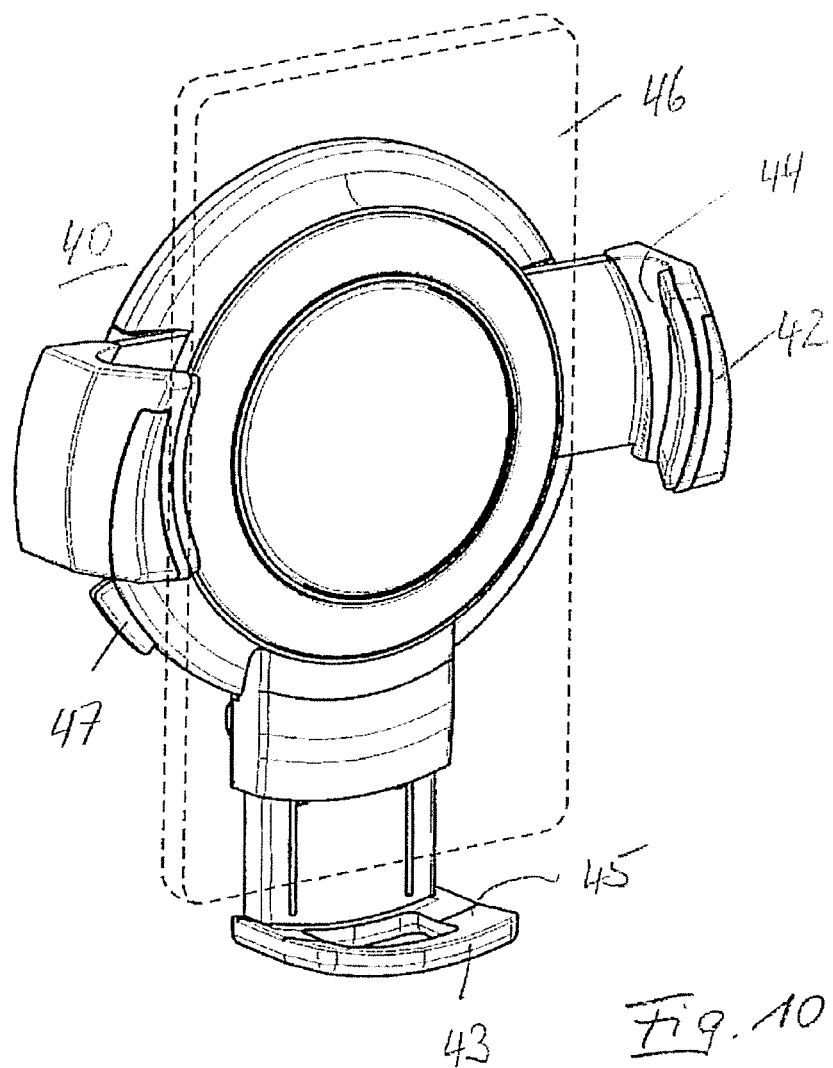
FIG. 10 shows a perspective view of the mount with a telecommunications device indicated in dashed lines.

A mount 40, which is shown in FIGS. 8 to 11, can be attached in locking fashion to the fastening plate 29 of the intermediate piece 20. The mount 40 has a circular rear wall 41, corresponding to the shape of the fastening plate 29, from which two lateral holding arms 42 extend laterally and a holding arm 43 in the form of a base extends downward. The holding arms 42, 43 are provided with clamping jaws 44, 45 which are specified for bearing against a telecommunications device 46 which essentially has the form of a flat cuboid (FIG. 10).

FIG. 8 shows the holding arms 42, 43 in their maximally extended position, and FIG. 9 shows them in their maximally retracted position.

The holding arms 42, 43 can be adjusted in a manner known per se out of the maximally extended position in FIG. 8 only in one direction. According to FIG. 10, the telecommunications device 46 is inserted into the mount 40 with the maximally extended holding arms 42, 43. The holding arm 43 in the form of a base is then pushed upward, i.e. drawn toward the rear wall 41 until a position which suits the telecommunications device 46 is reached. The lateral holding arms 42 are then retracted, their movement being coupled together, such that only adjustment of the lateral holding arms 42 which is symmetrical relative to the center axis is possible. As a result, it is ensured that the telecommunications device is always held symmetrically relative to the vertical center axis of the fastening plate 29.

The rear wall 41 is provided with a charging induction coil (not shown in the drawings) which is controlled by the supply voltage when the ignition is switched on. The mount 40 is accordingly specified for the inductive charging of a telecommunications device 46 provided for this purpose. By moving the holding arm 43 in the form of a base, the telecommunications device is pushed upward in front of the rear wall 41 until the electronics situated in the rear wall 41 establishes maximum correspondence between the charging induction coil situated in the rear wall 41 and the coil situated in the telecommunications device 46. At this moment, the mount 40 emits a display signal which displays to the user that the optimum position of the telecommunications device 46 in the mount has now been reached. In the exemplary embodiment shown, the display signal is an optical display signal which is generated by an LED in the rear wall. The holding arm 43 in the form of a base is designed as a fiber-optic conductor and is hence illuminated immediately in a visible fashion when the position of the telecommunications device 46 suitable for inductive charging is reached. The adjustment of the holding arm 43 in the form of a base should then be complete. Subsequently, the telecommunications device is clamped laterally by the clamping jaws 44 of the lateral holding arms 42 and consequently held securely in the mount 40. The holding arms 42, 43 can be released by activating an unlocking tab 47 which disconnects a set of locking teeth from the holding arms 42, 43 such that the latter can be restored to their extended position according to FIG. 8.

Figure 11:
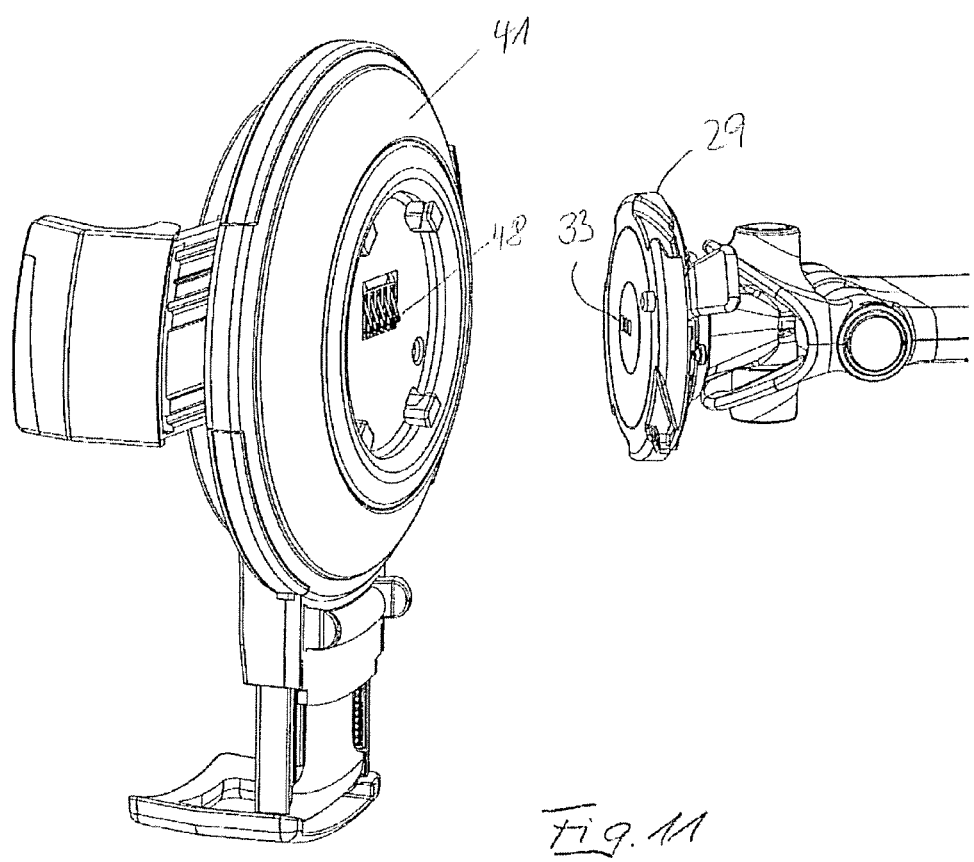
FIG. 11 shows a perspective view of the rear side of the mount, and of that section of the intermediate piece facing the rear side of the mount.
Figure 12:
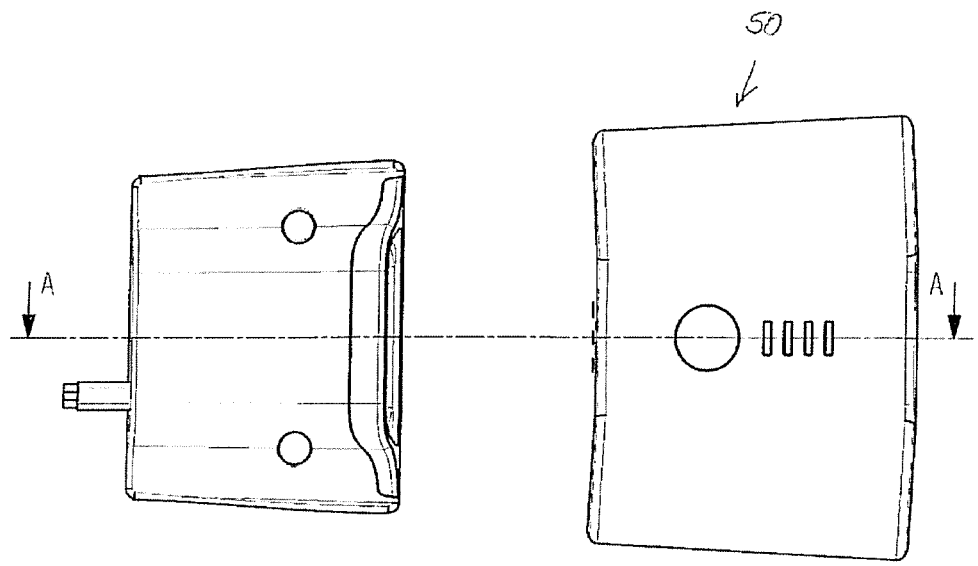
FIG. 12 shows a plan view of a receiving part and a device which can be fastened on the receiving part.
Figure 13:
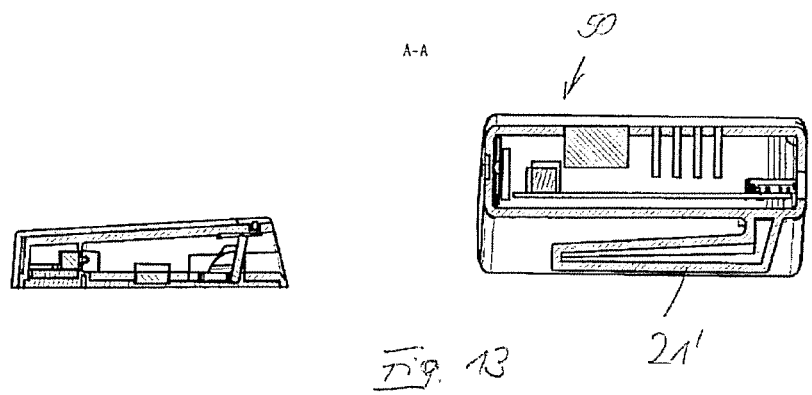
FIG. 13 shows a longitudinal section along the line A-A in FIG. 12.
Figure 14:
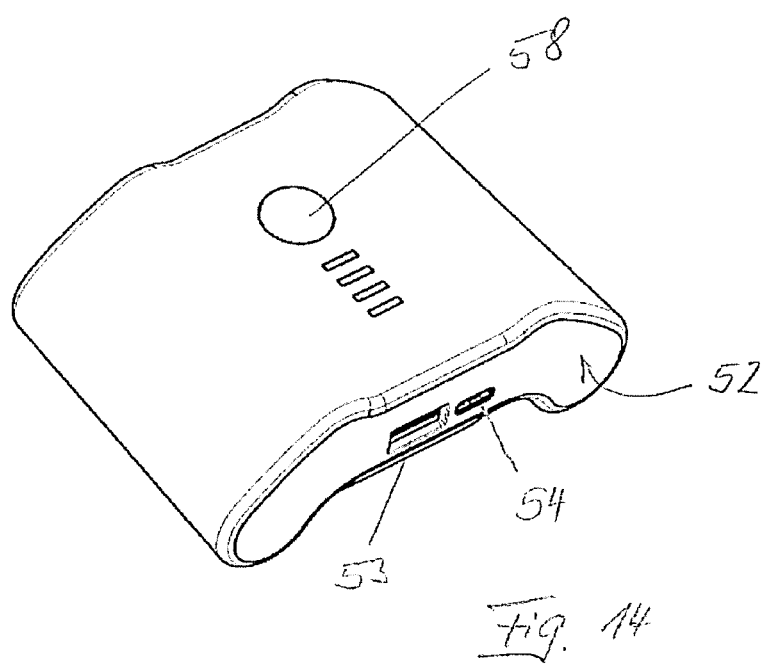
FIG. 14 shows a perspective view of the device, with a view of an end side.

The rear side of the rear wall 41 can be seen in FIG. 11, which is adapted to the shape of the fastening plate 29. Five spring contacts 48, which are arranged symmetrically, are situated on the rear side. The central spring contact is here provided for the ground potential and contacts a central contact face 33 of the fastening plate 29. The two spring contacts situated next to the central spring contact can be connected, for example, to the plus pole, whilst the outer spring contacts can be connected, for example, to the "ignition on/off" signal.

For both possible connection positions, which differ by 180°, the mount 40 is thus always supplied with the electrical signals or potentials, with the correct polarity.

The mount can thus also be locked on the fastening plate from above by the holding arm 43 forming the base, when this is required by the installation situation.

Owing to the intermediate piece 20, the telecommunications device 46 held in the mount 40 can be held at different heights, distances, and lateral inclinations so that the optimum position can be adjusted for a viewer.

However, other devices can also be inserted into the receiving part according to the invention when the mount of a telecommunications device 46 has been temporarily dispensed with. For example, two receiving parts 1 can also in particular be attached at suitable points in a vehicle. The receiving part 1 is attached in a manner known per se by applying the underside 3 on a suitable fastening point of the vehicle by means of a screw which can be a threaded screw, a self-tapping screw or the like, by means of an adhesive surface, i.e. for example an adhesive strip, by means of a suction foot or the like.

The device shown by way of example in FIGS. 12 to 17 is provided with a projection 21' and can thus be fastened directly on the receiving part 1 by the projection 21' being pushed into the receiving socket 10. The receiving part 1 is unaltered for this purpose.

Figure 15:
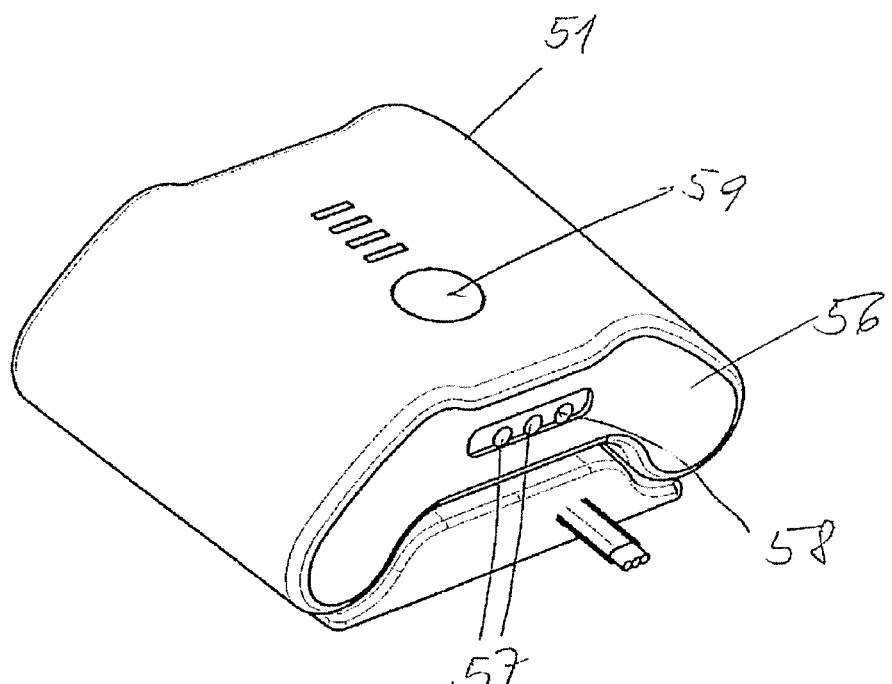
FIG. 15 shows a perspective view of the device pushed onto the receiving part, with a view of the opposite end side of the device.
Figure 16:
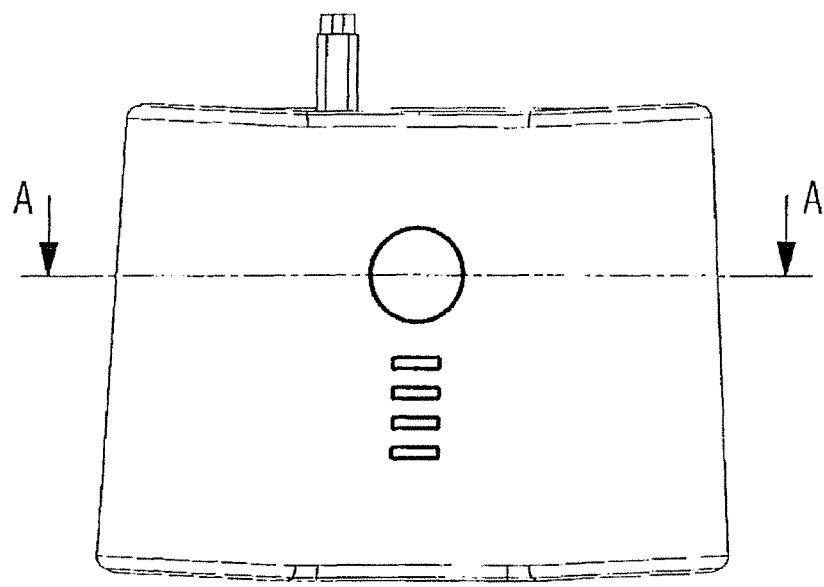
FIG. 16 shows a plan view of the device, showing a line of section A-A.

As illustrated in FIG. 15, the shape of the housing 51 of the device 50 can be adapted to the curved top side 4 of the receiving part 1, in order thus to ensure an esthetically appealing arrangement.

On an end side 52 of the housing 51, the device 50 has suitable interfaces, for example a USB-A port 53 and a USB-C port, via which, for example, cellphones can be connected to the device 50.

Figure 17:
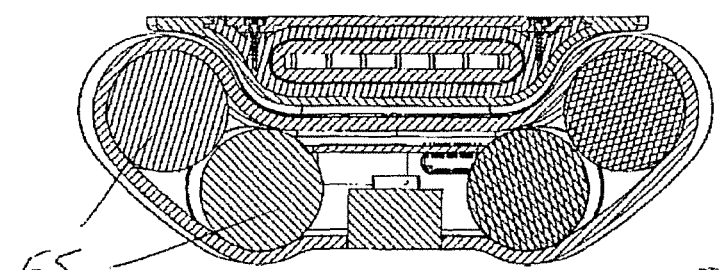
FIG. 17 shows a section through the device according to FIG. 16 along the line A-A.

As illustrated in the view in section in FIG. 17, the device 50, operating as a power bank, can be filled with high-performance batteries which can be charged when the vehicle is being used via the alternator or the vehicle battery. The device 50 can be removed from the receiving part 1 and then used to charge, for example, cellphones when their internal battery has run out of charge.

FIG. 15 also shows that the device 50 can be provided, on an opposite end wall 56, with optical displays 57 by means of which an operating state can be displayed. However, the device can also be used with a light, for example as a flashlight. A button 59 attached to the top side of the device here serves as an on-switch for the flashlight mode. This can be switches by the button 59 into different operating types, for example constant light, flashing light, or an SOS signal in Morse code. A long press on the button 59 switches the flashlight function on and off, whereas a short press on the button 59 changes over the respective lighting mode in sequence.

The device 50 shown as a power bank serves only to illustrate the possibilities for an additional device for the receiving part 1. Other devices are of course also possible in conjunction with the receiving part 1.

The invention claimed is:

1. A holding system for an electronic device in a vehicle, comprising:
   a receiving part for immovable fastening, and
   a mount to which the electronic device can be removably fastened, which is insertable into the receiving part,
   wherein the receiving part comprises a receiving socket with a slot-like entrance opening into which a projection with a shape complementing the receiving socket and connected to the mount when fitted, is configured to be pushed in a push-in direction and be fixed in the pushed-in state,
   wherein at least one magnet is arranged in at least one side of the receiving socket such that magnetic poles result which are active in the push-in direction, and in that magnetic poles are correspondingly formed in the projection which, when there is correct orientation, draw the projection into a fixed position in the receiving socket and, when there is incorrect orientation, hinder achievement of the fixed position.

2. The holding system as claimed in claim 1, wherein, in the fixed position in the receiving socket, the projection is situated in a mechanical locking position.

3. The holding system as claimed in claim 1 wherein the receiving part is connectable to electrical connection cables and has connection contacts in an end wall of the receiving socket, and wherein the projection has contact elements contacting the connection contacts in the fixed position, and with cables connected thereto for supplying electric potential to the mount.

4. The holding system as claimed in claim 3, wherein the end wall of the receiving socket has at least one protrusion next to the connection contacts, and wherein the projection has at least one recess which receives the protrusion in the pushed-in state.

5. The holding system as claimed in claim 1 wherein in a region of the slot-shaped entrance opening the width of the receiving socket is at least twice its height, and wherein the height reduces the greater the distance from the entrance opening, and wherein there is a corresponding reduction in the height of the projection.

6. The holding system as claimed in claim 5 wherein the entrance opening has a hinged flap which is pretensioned by a spring into a position closing the entrance opening and is pivoted by the pushed in projection into a position opening the receiving socket.

7. The holding system as claimed in claim 1 wherein the projection is part of an intermediate piece designed as a pivotable arm, a free end of which has a fastening plate for fastening the mount.

8. The holding system as claimed in claim 7, wherein the pivotable arm has at least three sections and two horizontal swivel joints spaced apart from each other and a vertical swivel joint perpendicular thereto.

9. The holding system as claimed in claim 1 wherein the mount is configured for receiving different telecommunications devices with adjustable holding arms.

10. The holding system as claimed in claim 9, wherein the mount has an induction coil in its rear wall which displays a correct positioning of a telecommunications device provided for inductive charging in front of the induction coil during the adjustment of a holding arm which takes the form of a base and carries the telecommunications device.

11. The holding system as claimed in claim 9 wherein two lateral holding arms are adjustable only when coupled to each other so that telecommunications devices of different widths are positionable only centrally in front of the rear wall.

* * * * *

UNITED STATES PATENT AND TRADEMARK OFFICE
CERTIFICATE OF CORRECTION

Page 1 of 1

PATENT NO.         : 10,668,867 B2
APPLICATION NO.    : 16/309145
DATED              : June 2, 2020
INVENTOR(S)        : Henryk Bury It is certified that error appears in the above-identified patent and that said Letters Patent is hereby corrected as shown below:

On the Title Page

At (71) Applicant, change (DE) to (PL).

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*